United States Patent [19]

Hattass et al.

[11] Patent Number: 5,234,250
[45] Date of Patent: Aug. 10, 1993

[54] RIGID LID FOR AN AUTOMOBILE ROOF

[75] Inventors: Rainer Hattass, Gründau; Dieter Federmann, Hanau, both of Fed. Rep. of Germany

[73] Assignee: Rockwell Golde GmbH - Federal Rep. of Germany, Fed. Rep. of Germany

[21] Appl. No.: 622,670

[22] Filed: Dec. 5, 1990

[30] Foreign Application Priority Data

Dec. 6, 1989 [DE] Fed. Rep. of Germany ....... 3940304

[51] Int. Cl.[5] .................................................. B60J 7/04
[52] U.S. Cl. .................................. 296/216; 49/480.1; 49/490.1
[58] Field of Search ................... 296/216; 49/480, 488, 49/490

[56] References Cited

U.S. PATENT DOCUMENTS

| 2,756,468 | 7/1956 | Bright | 49/490 |
| 2,813,748 | 11/1957 | Panik | 49/480 |
| 4,720,138 | 1/1988 | Schlapp | 49/488 X |
| 4,765,676 | 8/1988 | Grimm et al. | 296/216 |
| 4,765,677 | 8/1988 | Nagata | 296/216 |
| 4,783,117 | 11/1988 | Nagata | 296/216 |
| 4,937,126 | 6/1990 | Jackson | 49/490 X |
| 4,951,418 | 8/1990 | Keys | 49/490 X |

FOREIGN PATENT DOCUMENTS 0099424  4/1990  Japan ..................... 296/216

*Primary Examiner*—Dennis H. Pedder

[57] ABSTRACT

A rigid lid with edge gap seal for an automobile roof, which may be constructed either as a glass lid or as a sheet metal lid, comprising an edge gap sealing profile to be fixed directly to the lid for the purpose of compensating dimensional variations of the edge gap between automobile roof and lid, into which profile a gap compensating element, permanently deformable in the transverse direction, is moulded in. The gap compensating element is formed of a downwardly open U-profile, the inner flange of which is constructed non-deformable and is held to the outer periphery of the lid, and the outer flange of which is flexible for the purpose of dimensional change.

9 Claims, 4 Drawing Sheets

RIGID LID FOR AN AUTOMOBILE ROOF

FIELD OF THE INVENTION

This invention relates to a rigid lid for an automobile roof and in particular to a further development of the invention described in GB-2,212,116 A.

DESCRIPTION OF THE PRIOR ART

In GB-2,212,116 A, a rigid lid for an automobile is described, in which a gap compensating element is fully moulded into an edge gap sealing profile, formed in a specific manner, which in turn is secured to fixing elements of a plastics frame. The plastics frame is produced by injection moulding around the edge zones of a lid plate and reinforcing frame of the rigid lid with simultaneous forming of an upper border frame for the lid plate. The complete moulding-in of the gap compensating element into the edge gap sealing profile has proved to be very advantageous for the fundamental purpose of a simple and functionally appropriate construction of the gap compensating element.

An object of the present invention is to create a rigid lid with edge gap sealing, to which an edge gap sealing profile, into which a gap compensating element is fully moulded-in with all-round enclosure, can be fitted even when the lid is not provided with a plastics frame moulded onto the lid.

SUMMARY OF THE INVENTION

According to one aspect of the present invention, there is provided a rigid lid for an automobile roof with a roof opening, the lid having a closed position in which it fills the roof opening with all-round sealing and it can be displaced out of this opening to expose it at least partially, the lid comprising a id plate of glass or plastics material, a reinforcing frame, supporting the lid plate in its edge zone from below, and a border frame bearing from above against the upper face of the lid plate, wherein the reinforcing frame and the border frame are connected firmly together gripping the edge zone of the lid plate, wherein fixing elements for an edge gap sealing profile are fitted at the outer peripheries of reinforcing frame and border frame, wherein a gap compensating element, of metal and fully moulded into the edge gap sealing profile, is peripherally fixed to the outer periphery of the lid, which element can be permanently deformed in its transverse direction in a deformation zone with change in dimension, and wherein the edge gap sealing profile is less deformable in the region of the fixing elements of the fixing frame and border frame that hold the gap compensating element than in its outer edge zone, and the compensating element being formed of a downwardly-open U-profile, an inner flange of which is constructed to be substantially non-deformable and is held to the outer periphery of the lid, and an outer flange of which forms essentially the deformation zone and can be bent to change the dimensions.

According to a second aspect of the present invention, there is provided a rigid lid for an automobile roof with a roof opening, the lid having a closed position in which it fills the roof opening with all-round sealing and can be displaced out of this opening to expose it at least partially, the lid comprising a lid plate of sheet metal material and a reinforcing frame, supporting the lid plate in its edge region from below, wherein a downwardly cranked flange is formed at the outer periphery of the id plate as fixing element for an edge gap sealing profile, wherein a gap compensating element, of metal and completely moulded into the edge gap sealing profile, is fixed peripherally to the outer periphery of the lid, which element can be permanently deformed in its transverse direction in a deformation zone with change in dimension, and wherein the edge gap sealing profile is less deformable in the region of the fixing element of the lid plate which holds the gap compensating element than in its outer edge zone, and the gap compensating element being formed of a downwardly open U-profile, an inner flange of which is constructed to be substantially non-deformable and is held to the outer periphery of the lid, and the outer flange of which forms essentially the deformation zone and can be bent to change dimensions.

By the use of a gap compensating element in the form of a downwardly open U-profile with an outer flange (arm) that is free in all forms of construction and an inner flange serving for fixing to the outer periphery of the lid, a lid having an edge gap sealing profile is obtained, the edge gap sealing profile of which on the one hand can be reliably fixed in a simple manner to rigid lids without moulded-on frames, and on the other hand can be deformed easily to compensate any edge gap deviations that can occur, by the bending, without difficulty, of the free outer flange, until the edge gap sealing profile bears sealingly against the edge of the roof opening all around, when the lid is closed.

The deformability of the edge gap sealing profile by bending of the longer flange of the gap compensating element can be considerably further increased by providing that the outer flange is longer than the inner flange and for the edge gap sealing profile to possess, a downwardly open channel between the flanges.

A crown of the two flanges of the gap compensating element can be supported against upwardly orientated bending, and this advantageously assures that the gap compensating deformation of the edge gap sealing profile is limited substantially to the transverse direction.

In order to eliminate undesired bending deformations of the gap compensating element, especially bending back of the longer flange that is bent to compensate the gap, the outer flange can be fixed in its bent position In the case of a glass lid according to the first aspect of the invention, the edge gap sealing profile can be secured to the lid especially simply by arranging for the edge gap sealing profile to be pushed from above with its downwardly open channel onto an upward flange situated at the outer periphery of the reinforcing frame. Here it is advantageous, for the purpose of achieving deformations of the edge gap sealing profile which extend substantially in the transverse direction if the crown of the two flanges of the gap compensating element is supported against an outwardly orientated, outer flange of the border frame. This achieves at the same time also a securing of the edge gap sealing profile against pushing off upwards.

For the purpose of fixing the free outer flange of the gap compensating element embedded into the material of the edge gap sealing profile, the bent outer flange can be fixed by means of a support strip, adjustably fixed to the reinforcing frame, in the case of the first form of construction relating to a glass lid. The support strip used here for positional fixing can, by being provided, at its edge towards the outer flange, with a downwardly cranked flange, which engages into a groove of the edge gap sealing profile, engage force-transmittingly with the edge gap sealing profile, with the result that the free flange is secured in both possible directions of bending.

For fixing the support strip, screws provided for the firm connection between reinforcing frame and border frame are used, which pass through adjustment recesses of the support strip.

Since dimensional variations in the gap frequently occur only in short length regions of the lid periphery, the edge gap sealing profile in such cases only needs to be partially deformed and can be fixed according to the measures described above. This is facilitated by a variant of the construction according to the first aspect of the invention, in which the outer flange of the gap compensating element is subdivided by slits, disposed at intervals, into a plurality of bent portions which are prebent outwards, and the prebent bent portions, on the one hand, and the non-bent portions of the outer flange, on the other hand, situated between the bent portions are moulded each into associated webs of the edge gap sealing profile. Here, the outer flange of the gap compensating element is subdivided into individual bent portions, which can be bent independently of one another for the partial deforming of the edge gap sealing profile In the second form of construction according to the second aspect of the invention, intended for a sheet metal lid, the gap compensating element is additionally provided with an upwardly orientated fixing flange which is adjoined in one piece to the inner flange of the gap compensating element in such a manner that the inner flange and the fixing flange form an upwardly open U-profile, the edge gap sealing profile possessing, between the inner flange and the fixing flange, an upwardly open fixing channel, and that the edge gap sealing profile is pushed from below with its fixing channel clampingly onto the downward flange of the lid plate. By this means the edge gap sealing profile is pushed in simple manner from below onto the edge flange of the lid plate usual in the case of sheet metal lids and is held clampingly there.

Here, for achieving a desired deformation of the edge gap sealing profile in the transverse direction, that is for largely suppressing deformations in the crown region of the inner and outer flanges, it is advantageous if the crown formed by the inner flange and the outer flange of the gap compensating element, bears against a material thickening of the edge gap sealing profile situated above this crown and adjoining the outer face of the lid plate.

In this form of construction, the free, outer flange can be secured in its desired position by means of a splaying element introduced into the downwardly open channel. The splaying element used for this purpose may be formed of a plastics material mass which hardens after being introduced into the channel or by a wedge having self-locking properties.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
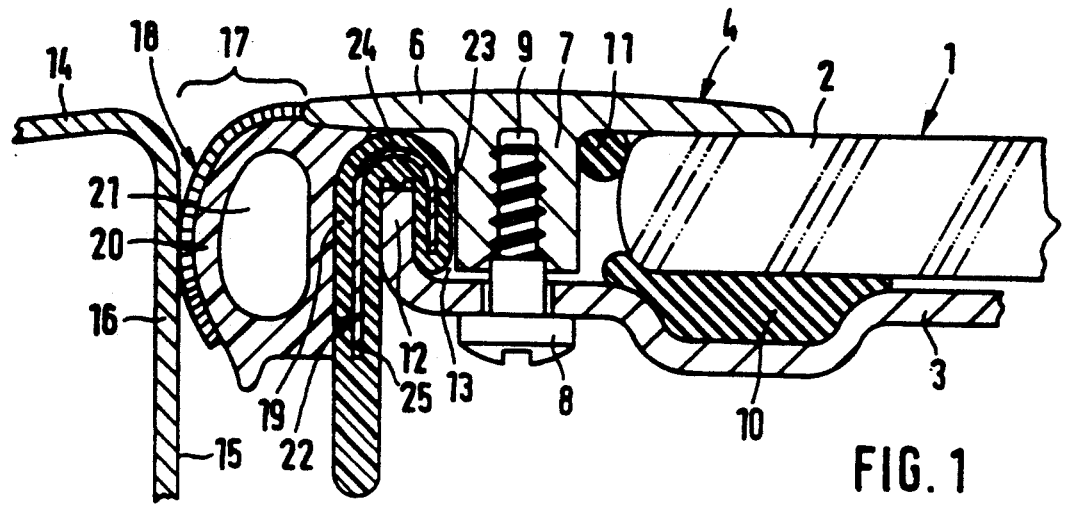
FIG. 1 is a section through the edge zone of a glass lid with gap compensating element fitted thereon, but not yet deformed to take up tolerances.
Figure 2:
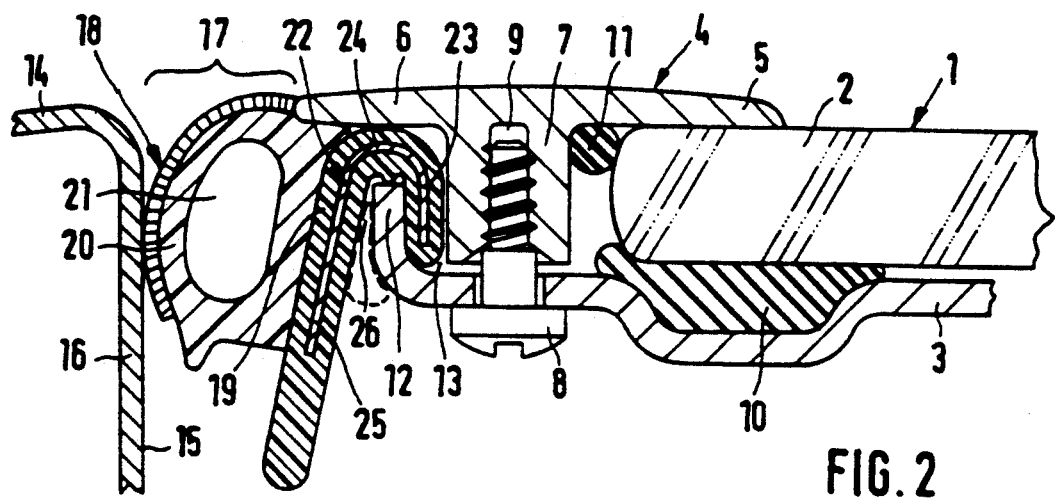
FIG. 2 is a section according to FIG. 1, but with deformed gap compensating element and correspondingly deformed or displaced edge gap sealing profile.

For explaining the first form of construction, reference is first made to FIGS. 1 and 2, in which as in the other figures also the parts are shown larger than the actual dimensions and partly cut away. In the first form of construction, relating to a glass lid 1, a lid plate 2, formed of glass or of a transparent plastics material, is underlain in its edge zone by a profiled reinforcing frame 3, which is constructed as a closed frame extending around all four sides of the lid or which may consist of several parts associated with the various sides of the lid. An upper border frame 4 of substantially T-section bears with an inner flange 5 against the upper face of the lid plate 2 and projects with an outer flange 6 beyond its central, downwardly orientated web 7. The reinforcing frame 3 and the border frame 4 are firmly connected together by screws 8, which pass through the reinforcing frame 3 and are screwed into bores 9 of the web 7. As the reinforcing frame 3 is screwed up to the border frame 4, the lid plate 2 is firmly clamped between the inner flange 5 and the reinforcing frame 3 with the intermediate insertion of a sealing compound 10. In this manner the lid plate 2, reinforcing frame 3 and border frame 4 are joined to the rigid glass lid 1. Between the peripheral edge of the lid plate 2 and the web 7, a further seal 11 is also provided. The reinforcing frame 3 projects outwards beyond the web 7 of the border frame 4 and is provided there with an upwardly orientated flange 12, the inner face of which, together with the outer face of the web 7, constitute the lateral walls of a seating gap 13. The upward flange 12 terminates at a distance below the lower face of the outer flange 6.

The rigid glass lid 1 is situated, in its closed position, inside a roof opening of an automobile roof 14, indicated partly cut away in the drawings. The roof opening is bounded by the inner surfaces 15 of vertical downward flanges 16 of the automobile roof 14. Between the rigid glass lid 1 and the downward flanges 16 there is a peripheral edge gap 17, which is sealingly closed by an edge gap sealing profile 18 when the roof opening is closed by the rigid glass lid 1. The construction and fitting of the edge gap sealing profile 18 to the glass lid 1 are described in more detail below.

The edge gap sealing profile 18 is, in this example, composed of two different but firmly united together materials, as indicated by the different hatching. The inner zone 19 of the edge gap sealing profile 18 is virtually not deformable, whereas the outer zone 20 is made easily deformable by the including of a cavity 21.

Into the inner zone 19 of the edge gap sealing profile 18, a gap compensating element 22 is moulded-in completely, that is surrounded on all sides by material of the edge gap sealing profile. The gap compensating element 22, for example of steel sheet, has the form of a downwardly open U-profile having an inner shorter flange or arm 23 and an outer, longer flange 25, joined thereto by an upper crown 24. The inner flange 23 is non-deformable and serves for fixing the edge gap sealing profile 18 to the lid 1, whereas the outer flange of the gap compensating element 22 is flexible and thus forms the deformation zone of the gap compensating element, as can be easily seen by comparing FIGS. 1 and 2.

The edge gap sealing profile 18 possesses, between the flanges 23 and 25, a downwardly open channel 26, by which it is pushed onto the upward flange 12 of the reinforcing frame 3 from above The pushing-on of the edge gap sealing profile 18 is, of course, done before the reinforcing frame 3 is joined to the border frame 4. After the two frames have been screwed together, the outer flange 6 of the border frame 4 bears against the edge gap sealing profile 18 from above, which in turn is seated on the upper edge of the upward flange 12. The inner flange 23, together with the material of the edge gap sealing profile encasing it, fills the seating gap 13, whereas the crown 24 of the gap compensating element 22, together with the embedding material of the edge gap sealing profile situated in this zone, closes the space between the outer flange 6 and the upward flange 12. The pushed-on edge gap sealing profile 18 is in this manner firmly held to the lid 1. The crown 24 of the gap compensating element 22 is supported against the outer flange 6 of the border frame 4, to prevent upwardly orientated bending.

In FIG. 1, the situation is illustrated that occurs when the edge gap 17 is constant in dimension. In this case, the flanges 23 and 25 of the gap compensating element 22 are in an approximately mutually parallel orientation, i.e. the gap compensating element is not deformed. If, the contrast, the edge gap 17 has excess dimensions, then to achieve a sealed bearing of the outer zone 20 of the edge gap sealing profile against the inner surface 15 of the downward flange 16, the gap compensating element 22 is deformed outwardly by bending its outer flange 25. In this way a widening of the channel 26 occurs with lifting-off of the edge gap sealing profile 18 from the outer surface of the upward flange 12, without the firm hold of the edge gap sealing profile 18 to the lid 1 being thereby lost. The outer flange 25 of the gap compensating element 22 can, of course, also be partially bent, if dimensional variations in the width of the edge gap 17 occur only partially. If, in contrast, the edge gap 17 is underdimensioned throughout or partially, then this is taken up in general by the elastic deformability of the outer zone 20 of the edge gap sealing profile 18. Basically, however, the longer flange 25 may also be bent inwards, i.e. towards the lid 1, starting from its position shown in FIG. 1.

Figure 3:
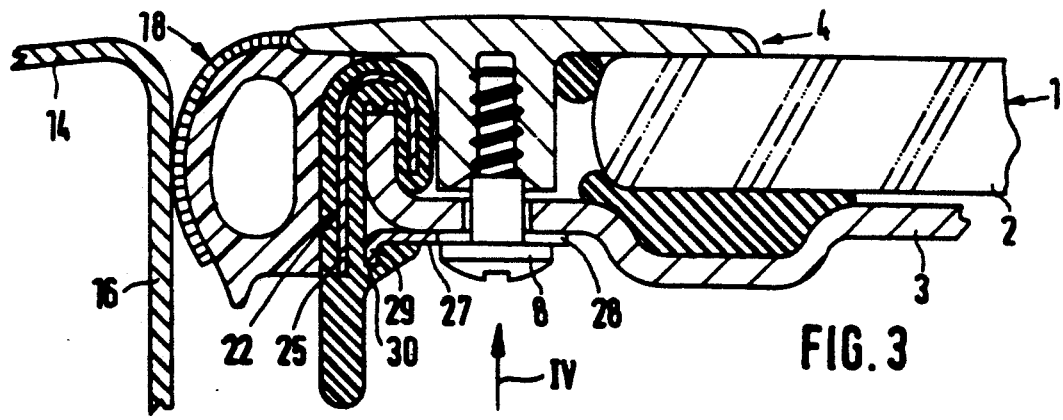
FIG. 3 is a section similar to FIG. 1 through the edge zone of a glass lid with outer flange of the gap compensating element secured by a support strip.
Figure 4:
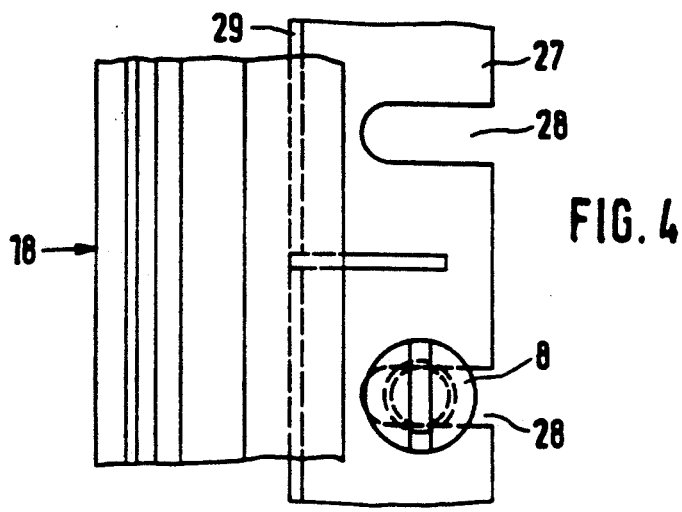
FIG. 4 is a view from below of the support strip and of the edge gap sealing profile viewed in the direction of arrow IV in FIG. 3.
Figure 5:
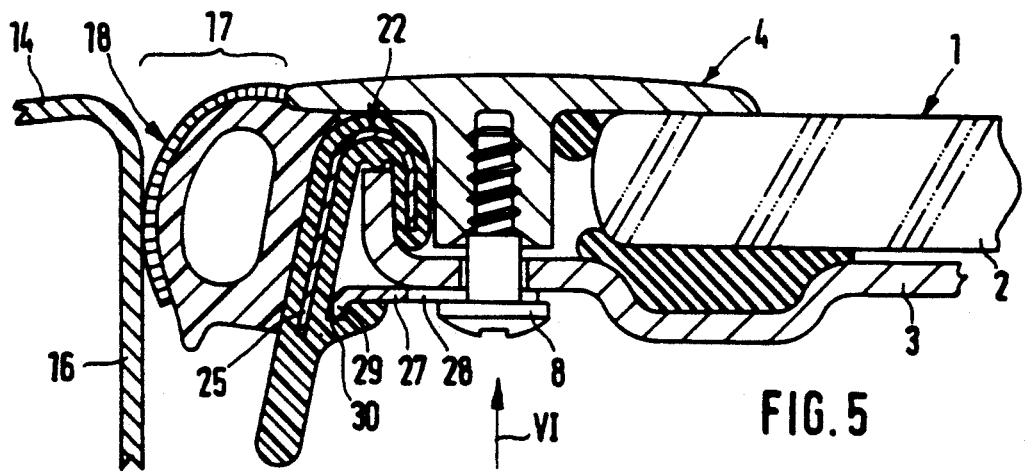
FIG. 5 is a section according to FIG. 3 in a deformed position similar to FIG. 2.
Figure 6:
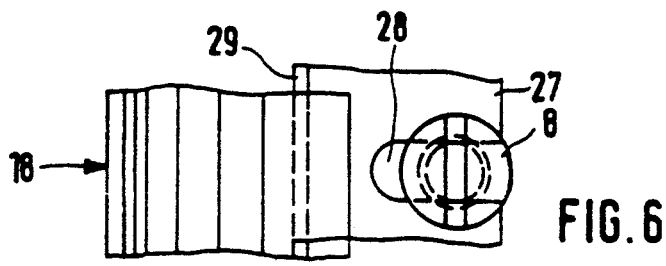
FIG. 6 is the view from below similar to FIG. 4 in the direction of arrow VI of FIG. 5 and with a modified relative position of the components shown.

In order to avoid undesired bendings of the outer flange 25 after the working step serving for gap compensation has been carried out, the outer flange 25 can be secured, for example by the arrangement shown in FIGS. 3 to 6. Here, the bent outer flange 25 can be secured by a support strip 27, adjustably attached to the reinforcing frame 3. For fixing the support strip 27, the screws 8, provided for the firm connection between the reinforcing frame 3 and the border frame 4, are used, these screws passing through adjustment recesses 28 of the support strip 27. In the example shown, the adjustment recesses 28 are formed as slits open at one end. If the outer flange 25, starting from the position according to FIG. 3, is bent into the position of FIG. 5, then the support strip 27 is pushed outwards until it bears firmly against the edge gap sealing profile 18 and it is fixed by tightening the relevant screws 8. The support strip 27 may be provided, at its edge nearest the outer flange 25, with a downward flange 29, which engages into a groove 30 of the edge gap sealing profile 18. In this way, the bent, outer flange 25 is secured against bending in the two possible directions of bending and naturally, also, against springing back.

Figure 7:
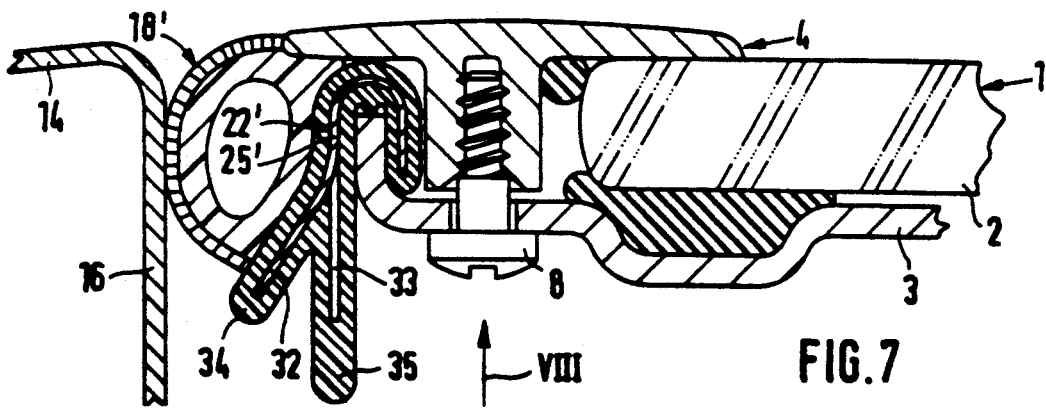
FIG. 7 is a section through the edge zone of a glass lid with modified gap compensating element, fitted on but not yet deformed to take up tolerances.
Figure 8:
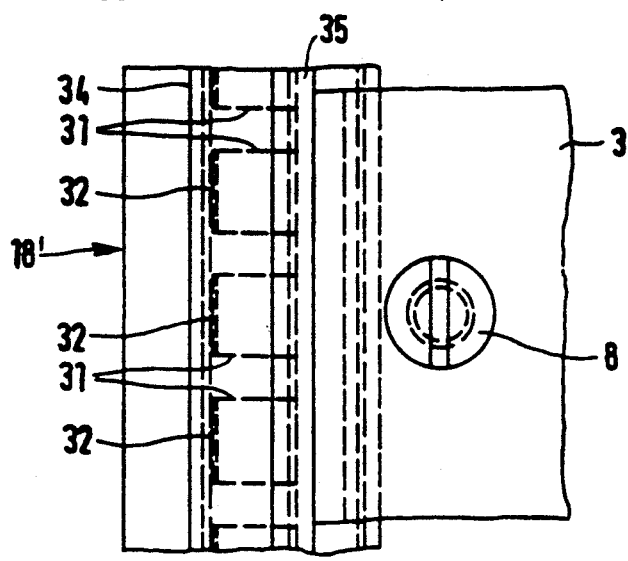
FIG. 8 is a view from below of the edge zone in the direction of arrow VIII in FIG. 7.
Figure 9:
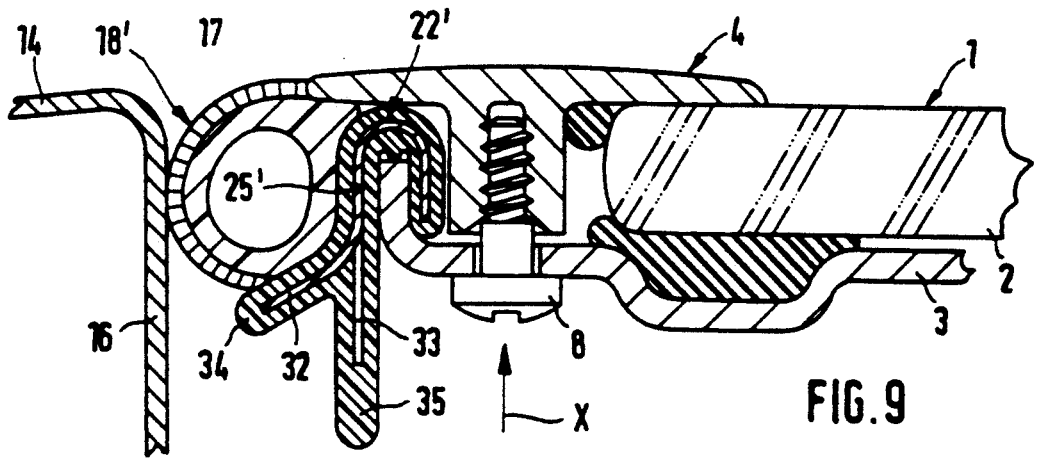
FIG. 9 is a section according to FIG. 7 in a deformed position of the gap compensating element.
Figure 10:
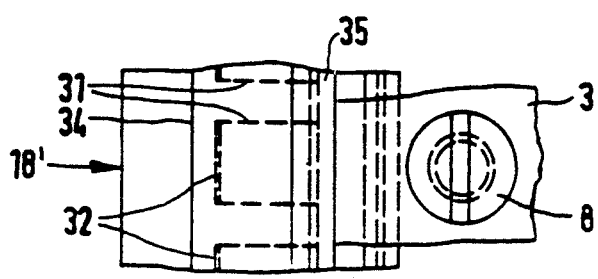
FIG. 10 is a view from below similar to FIG. 8 in the direction of arrow X in FIG. 9.

A variant of construction of the form of construction described in relation to FIGS. 1 and 2 is illustrated in FIGS. 7 to 10. Here, the outer flange 25' of the gap compensating element 22' is subdivided by slits 31, arranged at intervals, into a plurality of bent portions with portions 33, not intended to be bent, alternating between them. The bent portions 32 are, as shown in FIGS. 7 and 8, prebent outwards and can be bent still further outwards starting from the prebent position, as shown in FIG. 9, or may also be bent inwards. In either case, an adaptation to the dimensional variations of the edge gap 17 is possible. The bent portions 32, on the one hand, and the non-bent portions 33 situated between the bent portions 32, on the other hand, are moulded each into associated, continuous webs 34, 35 respectively of the edge gap sealing profile 18'. This variant of construction is suitable especially for adaptation of the edge gap seal to only partially occurring dimensional variations of the edge gap 17. Here again, the bent position set by bending the bent portions 32 can be fixed by a support strip (not illustrated), which for this purpose has to be passed with comb tooth-like projections between the portions 33 until in support bearing against the web 34.

The form of embodiment illustrated in FIGS. 11 and 12 relates to a rigid sheet metal lid 101, of which the lid plate 102, moulded from sheet metal material, is supported in its edge zone from below by a reinforcing frame 103, firmly fixed to it. A downward edge flange 140 provided at the outer periphery of the lid plate 102, and which is doubled by a corresponding edge flange 141 of the reinforcing frame 103, forms a fixing element for the edge gap sealing profile 118. Into the edge gap sealing profile 118, in the present form of embodiment also, a gap compensating element 122 of metal is moulded-in, which element can be permanently deformed in its transverse direction with dimensional change. The edge gap sealing profile 118 possesses basically the construction described in relation to FIGS. 1 and 2, with the exception of the differences explained in more detail below.

In this form of construction also, the gap compensating element 122 is formed basically of a downwardly open U-profile, the inner flange 123 of which is made undeformable and serves for fixing to the outer periphery of the lid 101, i.e. to the downward edge flange 140, and the outer flange 125 of which constitutes basically the deformation zone of the gap compensating element 122 and is flexible for the purpose of dimensional change.

Here again, the outer flange 125 is longer than the inner flange 123, in order to facilitate the bending action against the gap compensating element 122. The edge gap sealing profile 118 possesses, between the flanges, once again a downwardly open channel 126, which in the present case does not serve for fixing the edge gap sealing profile 118, but facilitates the bending of the outer flange 125. The crown 124 of the two flanges 123 and 125 is supported to prevent upward bending against a material thickening 142 of the edge gap sealing profile 118, this thickening being situated above the crown and adjoining the outer face of the lid plate 102. Bendings of the outer flange 125 therefore lead, basically, only to a transverse deformation of the edge gap sealing profile 118 which change the gap dimension of the edge gap 117.

The inner flange 123 of the gap compensating element 122 is adjoined in one piece by an upwardly orientated fixing flange 143. The inner flange 123 constitutes, together with the fixing flange 143, an upwardly open U-section.

Correspondingly, the edge gap sealing profile 118 is so formed that it possesses, between the inner flange 123 and the fixing flange 143, an upwardly open fixing channel 144. The edge gap sealing profile 118 is pushed from below with this fixing channel 144 clampingly onto the downward edge flange 140 of the lid plate 102 and, in the example shown, also onto the downward edge flange 141 of the reinforcing frame 103.

Figure 11:
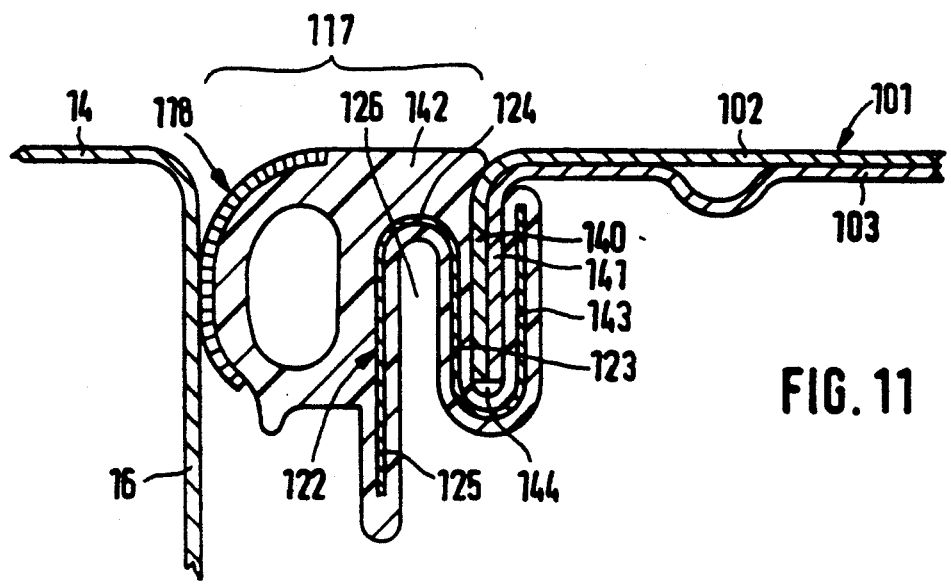
FIG. 11 is a section through the edge zone of a sheet metal lid with gap compensating element fitted on but not yet deformed to take up tolerances.
Figure 12:
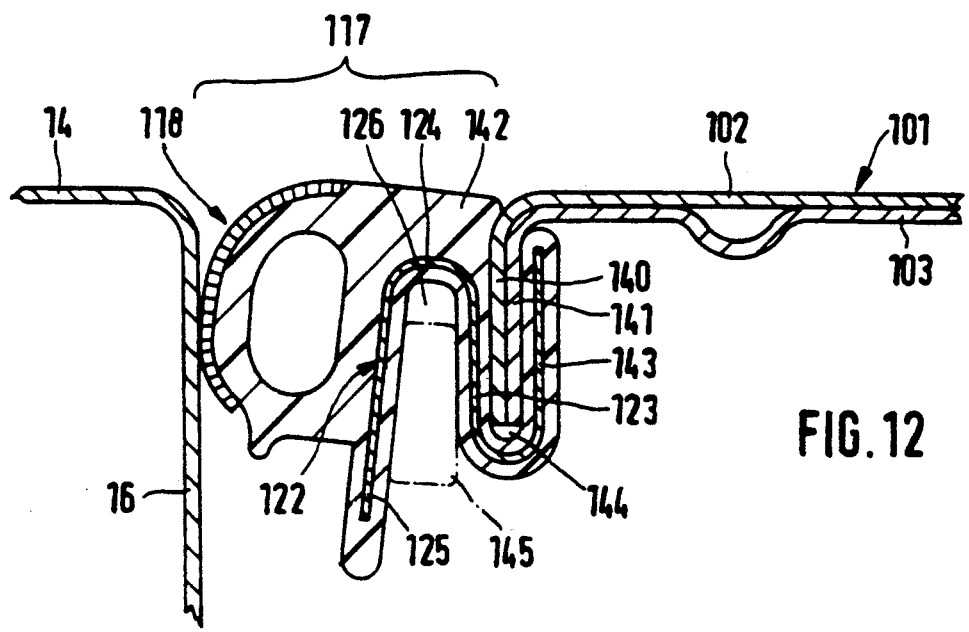
FIG. 12 is the section according to FIG. 11, but with the gap compensating element deformed and accordingly deformed or displaced edge gap sealing profile.

Bendings of the outer flange 125 starting from the initial position illustrated in FIG. 11 can be fixed by a splaying element 145, introduced into the downwardly open channel 126. The splaying element 145, indicated in dot-and-dash lines in FIG. 12, can be formed from a plastics material which hardens after it is introduced into the channel 126. A wedge having self-locking properties may, however, also be used as splaying element 145. The self-locking can be promoted by gluing the splaying element into the channel 126.

The use of a splaying element of this type is also appropriate in the form of construction described in relation to FIGS. 1 and 2. The splaying element would then be introduced from below into the channel 26 (FIG. 2) between the outer face of the upward flange 12 and the surface of the edge gap sealing profile 18 facing towards this.

We claim:

1. A rigid lid for an automobile roof with a roof opening, the lid having a closed position in which said lid fills the roof opening with continuous peripheral sealing and said lid can be displaced out of this opening to expose it at least partially, the lid comprising a lid plate of glass or plastics material, a reinforcing frame supporting the lid plate at a peripheral portion from below, and a border frame bearing from above against the upper face of the lid plate, wherein the reinforcing frame and the border frame are connected firmly together gripping the periphery of the lid plate, wherein fixing elements for an edge gap sealing profile are fitted at the outer peripheries of reinforcing frame and border frame, wherein a gap compensating element, of metal and fully moulded into the edge gap sealing profile, is peripherally fixed to the outer periphery of the lid, and the compensating element being formed of a downwardly-open U-profile, an inner flange of which is constructed to be substantially non-deformable and is held to the outer periphery of the lid, and an outer flange of which forms essentially a deformable member which can be bent to adjust peripheral dimensions in a traverse direction, wherein the outer flange can be fixed in its bent position and wherein the bent outer flange is fixed by means of a support strip, adjustably fixed to the reinforcing frame.

2. A lid according to claim 1, and the support strip is provided, at its edge towards the outer flange, with a downwardly cranked flange and the edge gap sealing profile has a groove into which said downwardly cranked flange engages.

3. A lid according to claim 1, and, for fixing the support strip, screws provided for the firm connection between reinforcing frame and border frame are used, the support strip having adjustment recesses through which the screws pass.

4. A rigid lid for an automobile roof with a roof opening, the lid having a closed position in which said lid fills the roof opening with continuous peripheral sealing and said lid can be displaced out of this opening to expose it at least partially, the lid comprising a lid plate of glass or plastics material, a reinforcing frame, supporting the lid plate at a peripheral portion from below, and a border frame bearing from about against the upper face of the lid plate, wherein the reinforcing frame and the border frame are connected firmly together gripping the periphery of the lid plate, wherein fixing elements for an edge gap sealing profile are fitted at the outer peripheries of reinforcing frame and border frame, wherein a gap compensating element, of metal and fully moulded into the edge gap sealing profile, is peripherally fixed to the outer periphery of the lid, and the compensating element being formed of a downwardly-open U-profile, an inner flange of which is constructed to be substantially non-deformable and is held to the outer periphery of the lid, and an outer flange of which forms essentially a deformable member which can be bent to adjust peripheral dimensions in a traverse direction and wherein the outer flange of the gap compensating element is subdivided by slits, disposed at intervals, into a plurality of bent portions which are prebent outwards, and the prebent bent portions, on the one hand, and non-bent portions of the outer flange, on the other hand, situated between the bent portions are moulded each into associated webs of the edge gap sealing profile.

5. A rigid lid for an automobile roof with a roof opening, the lid having a closed position in which said lid fills the roof opening with continuous peripheral sealing and said lid can be displaced out of this opening to expose it at least partially, the lid comprising a lid plate of glass or plastics material, a reinforcing frame, supporting the lid plate at a peripheral portion from below, and a border frame bearing from about against the upper face of the lid plate, wherein the reinforcing frame and the border frame are connected firmly together gripping the periphery of the lid plate, wherein fixing elements for an edge gap sealing profile are fitted at the outer peripheries of reinforcing frame and border frame, wherein a gap compensating element, of metal and fully moulded into the edge gap sealing profile, is peripherally fixed to the outer periphery of the lid, and the compensating element being formed of a downwardly-open U-profile, an inner flange of which is constructed to be substantially non-deformable and is held to the outer periphery of the lid, and an outer flange of which forms essentially a deformable member which can be bent to adjust peripheral dimensions in a traverse direction and wherein the two flanges of the gap compensating element from a crown which is supported against upwardly oriented bending and wherein the crown bears against a material thickening of the edge gap sealing profile situated above this crown and adjoining the outer face of the lid plate.

6. A rigid lid for an automobile roof with a roof opening, the lid having a closed position in which said lid fills the roof opening with continuous peripheral sealing and said lid can be displaced out of this opening to expose it at least partially, the lid comprising a lid plate of glass or plastics material, a reinforcing frame, supporting the lid plate at a peripheral portion from below, and a border frame bearing from about against the upper face of the lid plate, wherein the reinforcing frame and the border frame are connected firmly together gripping the periphery of the lid plate, wherein fixing elements for an edge gap sealing profile are fitted at the outer peripheries of reinforcing frame and border frame, wherein a gap compensating element, of metal and fully moulded into the edge gap sealing profile, is peripherally fixed to the outer periphery of the lid, and the compensating element being formed of a downwardly-open U-profile, an inner flange of which is constructed to be substantially non-deformable and is held to the outer periphery of the lid, and an outer flange of which forms essentially a deformable member which can be bent to adjust peripheral dimensions in a traverse direction wherein the outer flange can be fixed in its bent position and comprising a splaying element and wherein the bent, outer flange can be fixed by means of the splaying element, which is introduced into the downwardly open U-profile.

7. A lid according to claim 6, and wherein a plastics material mass which hardens after being introduced into the channel downwardly open U-profile is used as splaying element.

8. A rigid lid for an automobile roof with a roof opening, the lid having a closed position in which said lid fills the roof opening with continuous perimeter sealing and can be displaced from this opening to expose said roof opening at least partially, the lid comprising a lid plate of sheet metal material and a reinforcing frame supporting the lid plate in its edge region from below wherein a downwardly cranked flange is formed at the outer periphery of the lid plate as a fixing element for an edge gap sealing profile, wherein a gap compensating element of metal is completely moulded into the edge gap sealing profile and fixed peripherally to the outer periphery of the lid, said gap compensating element being formed of a downwardly open U-profile, an inner flange of said element being constructed to be substantially non-deformable and said element being held to the outer periphery of the lid, and the outer flange of said element forms essentially a deformable member and can be bent to adjust peripheral dimensions in a traverse direction and wherein the outer flange is fixed in its bent position by fixing means.

9. A rigid lid for an automobile roof with a roof opening, the lid having a closed position in which it fills the roof opening with continuous perimeter sealing and can be displaced from this opening to expose said roof opening at least partially, the lid comprising a lid plate of sheet metal material and a reinforcing frame supporting the lid plate in its edge region from below wherein a downwardly cranked flange is formed at the outer periphery of the lid plate as a fixing element for an edge gap sealing profile, wherein a gap compensating element of metal is completely moulded into the edge gap sealing profile and fixed peripherally to the outer periphery of the lid, said gap compensating element being formed of a downwardly open U-profile, an inner flange of said element being constructed to be substantially non-deformable and said element being held to the outer periphery of the lid, and the outer flange of said element forms essentially a deformable member and can be bent to adjust peripheral dimensions in a traverse direction and wherein the outer flange can be fixed in its bent position; and, comprising a splaying element and wherein the bent, outer flange can be fixed by means of the splaying element, which is introduced into the downwardly open U-profile.

* * * * *